March 21, 1950      H. G. TRAVER      2,501,364
ROTARY LAND TILLING APPARATUS
Original Filed March 31, 1944      2 Sheets-Sheet 1
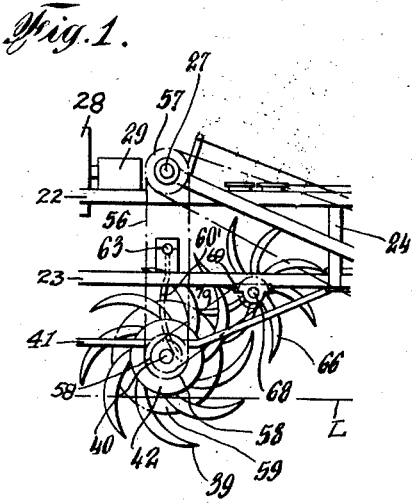
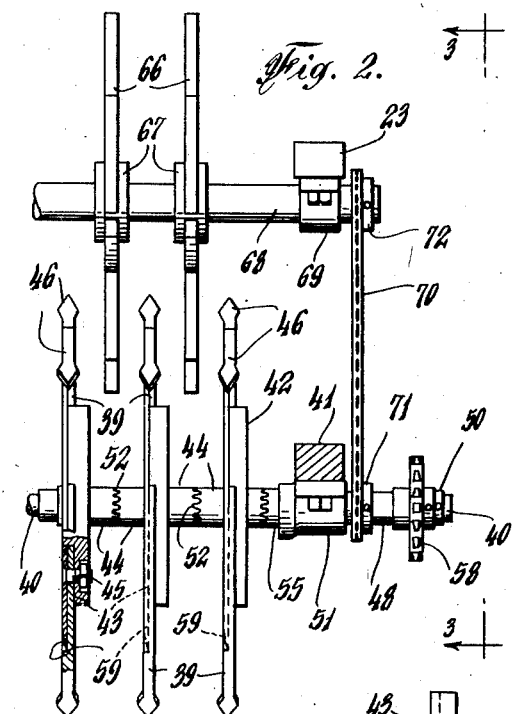
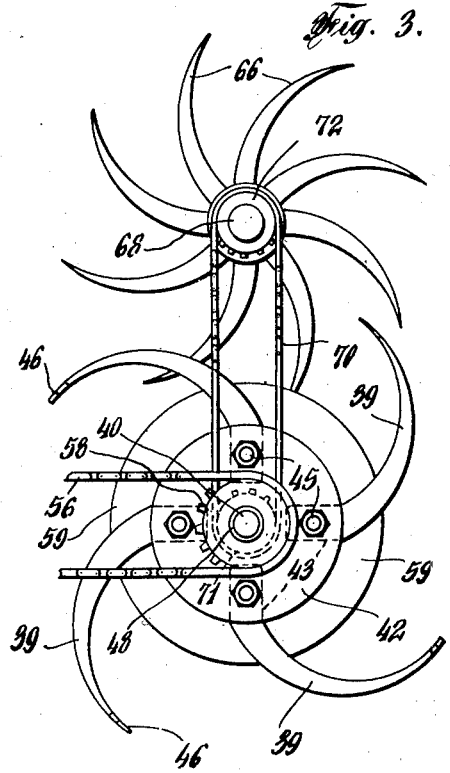
INVENTOR.
H. G. Traver
BY John A. Seifert
ATTORNEY March 21, 1950 H. G. TRAVER 2,501,364
ROTARY LAND TILLING APPARATUS
Original Filed March 31, 1944 2 Sheets-Sheet 2
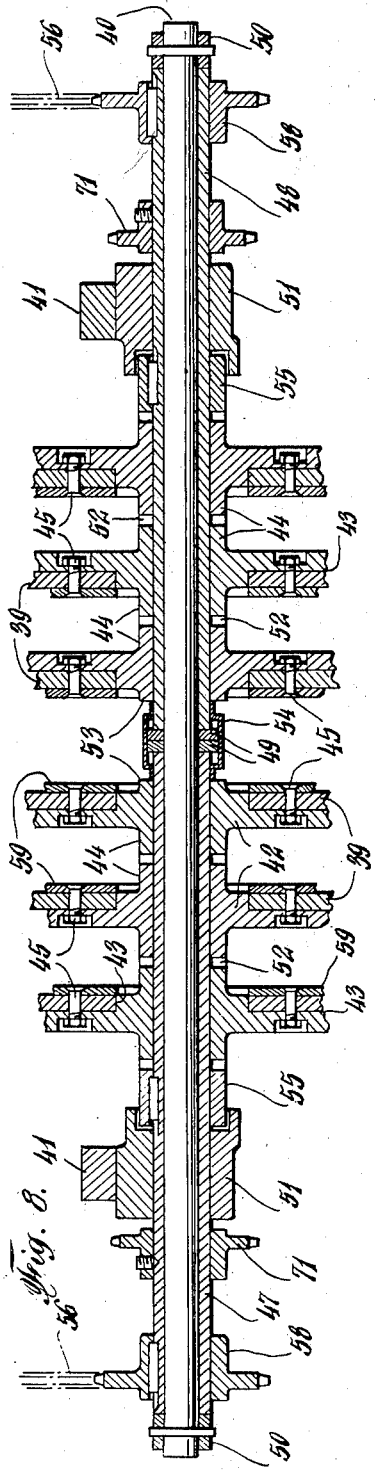
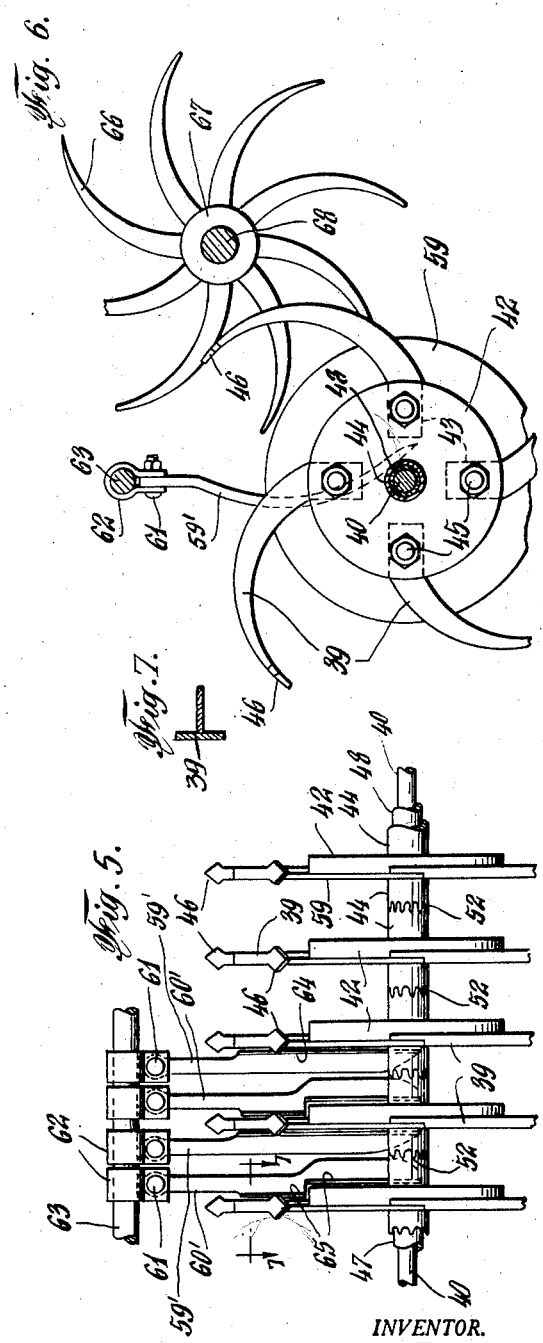
INVENTOR.
H. G. Traver
BY John A. Seifert
ATTORNEY Patented Mar. 21, 1950

2,501,364

UNITED STATES PATENT OFFICE 2,501,364

ROTARY LAND TILLING APPARATUS

Harry G. Traver, Cranford, N. J.

Original application March 31, 1944, Serial No. 528,937. Divided and this application June 1, 1945, Serial No. 597,111

2 Claims. (Cl. 97—212)

This invention relates to agricultural apparatus for breaking, working and tilling the land or ground and preparing the same for seeding and raising of crops, wherein the land working means consists of circumferentially spaced sets of radially extending land digger blades supported in axial spaced relation to rotate about a horizontal axis in circular paths and the blades curved in a direction towards the tips, and said sets of blades rotated in the direction of the curvature thereof and cause the blades to penetrate the ground, then move for a portion of the rotation of the blades into the ground, and then move through and out of the ground breaking up and loosening the land, the present application being a division of my co-pending application Serial No. 528,937, filed March 31, 1944, now Patent No. 2,455,147, dated November 30, 1948.

It is an object of the invention to provide an improved construction and arangement of land working means of this character, comprising a series of sets of digger blades mounted on a rotatable shaft to have independent rotative adjustment whereby the sets of blades may be rotatably adjusted on the shaft one relative to the other and position one set of blades in staggered relation to adjacent sets of blades, and arranged with means to operatively connect and rotate the blades with the shaft.

It is another object of the invention to provide in land working apparatus of this character disk cutters, one fixed to and rotatable with each set of blades and of less diameter than the circle circumscribed by the revolving blades adapted to cut vegetation and the ground into strips parallel to the line of travel of the blades to facilitate the blades penetrating and passing through the land and the breaking up and working of the land by the blades, and the provision of means to scrape from the cutters and the blades soil and other material adhering thereto and means to clear foreign substances from the land working blades.

It is a further object of the invention to provide in land working and tilling apparatus of this character a supporting structure for the shaft carrying the digger blades and power means carried by the supporting structure operatively connected to and rotating the shaft with the digger blades.

Other objects and advantages of the invention will hereinafter appear.

In the drawings accompanying and forming a part of this application there is shown the embodiment of the invention, wherein—

Figure 1 is an elevational view of the digger blades, disk cutters, scrapers and means to clear foreign substances from the blades mounted on a supporting structure.

Figure 2 is an elevational view of an end portion of the shaft carrying the digger blades and means for removing from the blades foreign substances accumulated thereon and showing means for driving the latter from the blade carrying shaft.

Figure 3 is a view looking at the right of Figure 2.

Figure 4 is an elevational view of a hub member on which the digger blades are fixed adapted to be independently mounted on the operating shaft therefor and arranged to operatively couple together juxtaposed blade carrying hubs.

Figure 5 is a front elevational view of a portion of the digger blades for breaking and loosening the land mounted on supporting and rotating shafts therefor and showing scrapers for scraping soil and other foreign substances from the blades and cutters associated therewith.

Figure 6 is a view looking at the right of Figure 5 and also showing in connection therewith means to clear foreign substances from the land breaking and loosening blades.

Figure 7 is a cross sectional view of one of the land breaking and loosening blades, the section being taken on the line 7—7 of Figure 5.

Figure 8 is a longitudinal sectional view to show the rotatable mounting of hollow shafts upon which the hubs carrying the land breaking and loosening blades and cutter disks are mounted to rotate therewith.

The embodiment of the invention illustrated in the drawings for carrying out the invention comprises a frame consisting of parallelly superposed side members 22, 23, secured in superposed relation by upright members 24. The frame supports power means, not shown, and said power means is operatively connected to a drive shaft 27 through a clutch and change speed mechanism, shown in a conventional manner at 28 and 29, respectively. The clutch is provided with the usual means for engaging and disengaging the clutch, and the change speed mechanism is enclosed in a housing and provided with the usual actuating means for operatively connecting different elements thereof to rotate the output shaft at different speeds.

Means to break and loosen the land or ground, shown in dot and dash lines at L, are rotatably carried below the frame and shown as comprising sets of radial digger blades 39 spaced circumferentially about and longitudinally of a shaft 40 extending transversely of and below the frame, and shown as journalled in bearings 51 mounted on a sub-frame 41 fixed to and suspended below the lower side members 23 of the frame, as shown in Figures 1 and 2. Each set of digger blades consists of four blades although a greater or less number may be utilized in each set with the blades mounted on and circumferentially spaced 90 degrees from each other about a disk portion of hub members 42 by engaging one end of the blades in recesses 43 in one face of the hub disks extending radially inwardly from the periphery toward a pair of tubular portions 44 extending axially from the opposite sides of the disk portion, as shown in Figures 2, 4, 5 and 8, and the blades secured therein by bolts 45. The portion of the digger blades 39 outwardly from the portion at which they are secured to the disk hubs extend radially outward and are curved in a direction of rotation of said blades, as shown in Figures 1, 3 and 6, whereby as the blades are revolved with the rotation of the blade carrying hubs they penetrate into the land or ground for substantially one-third of their length, pass through the land for a portion of the revolving movement of the blades and then out of the land thereby lifting the land and effecting a breaking up and loosening of the land. The end portion of the blades at which they are secured to the hub disks are substantially flat and the portion outwardly therefrom is of T-shape in cross section, as shown in Figure 7, and are progressively reduced in cross section or taper to a point within the tips and the tips flattened and arranged of barbed form, as shown at 46.

The shaft 40 extends through and is supported in a hollow shaft which may be a single shaft, but preferably consists of a pair of sections 47, 48, as shown in Figure 8, with a pair of abutments 49 interposed between the inner ends of said hollow shafts and retained on the shaft 40 by collars pinned on said latter shaft at the outer ends of the hollow shafts, as shown at 50, the hollow shafts being journalled in bearings 51 mounted on the sub-frame 41. The digger blade carrying hubs 42 are loosely mounted on the hollow shafts to have rotative adjustment one relative to the other and to be connected to rotate one from the other and in unison with the hollow shafts. For this purpose the ends of the tubular or sleeve portions 44 of the hubs are arranged as a jaw clutch member and the jaw clutch member of adjacent hubs are adapted to be engaged to couple the hubs together, as shown at 52 in Figures 2, 4, 5 and 8. The tubular or sleeve portion 44 at the inner end of the inner hubs are removed, as shown at 53 in Figure 8, and said ends of the hubs abutting the ends of a longitudinally split grease retaining and dust excluding member 54 engaged over the abutments 49 and the inner ends of the tubular shafts. The digger blade carrying hubs are retained in assembled relation and coupled together by the jaw clutch members 52 of adjacent hubs by a sleeve 55 keyed to the hollow shafts at the outer end of the outermost digger blade carrying hubs, one end of said sleeves being arranged as a jaw clutch member to engage the clutch jaws on the outer tubular portion of said outer hubs and thereby coupling the digger blade carrying hubs to the hollow shafts to rotate therewith. The outer end of the sleeves 55 engages in an annular recess in the end of the bearings 51, the outer annular wall of said recesses serving to retain lubricant in and exclude dust from the bearings. The hollow shafts 47, 48 are rotated from the drive shaft 27 by sprocket chains 56 passing around sprocket wheels 57 fixed on or keyed to the end portions of the drive shaft 27 and sprocket wheels 58 keyed to the ends of the hollow shafts 47, 48 extending outwardly from the bearings 51, as shown in Figures 1 and 8.

To facilitate breaking and loosening of the land by the digger blades, means are provided to cut or slice the land in the direction of the revolving movement and travel of the digger blades and also cut vegetation, such as a cover crop, stalks and trash. As shown, said means consists of disk cutters 59 engaged upon a tubular portion 44 of the digger blade carrying hubs 42 extending from the side of the hub disks and in recesses in the hub disks and side of the digger blades, as shown in Figure 2. The disk cutters are secured to the disk portion of the hubs by the bolts 45 securing the digger blades to the hub disks, the heads of the bolts being recessed into the disk cutters and the nuts on the bolts recesed into the hub disks. The cutter disks are of less diameter than the circle circumscribed by the digger blades.

During the digging operation of the digger blades 39 and disk cutters 59, soil and other material will adhere to and accumulate on the digger blades and disk cutters, particularly so if the ground is moist, which may interfere with the efficient operation of the land breaking and loosening means. Means are, therefore, provided to remove from the disk portion of the hub members, the cutter disks and digger blades any such material adhering thereto. As shown, said means comprises scrapers 59', 60' of curved form in longitudinal section suspended from bolts 61 between split clamping collars 62 mounted on a bar 63 fixed to the side frame members 23 and extending transversely of the frame or supporting structure, the bolts 61 also serving to clamp the scraper carrying collars 62 to said bar 63. The scrapers extend downwardly to one side of the tubular portions 44 of the digger blade carrying hubs, the scrapers 59' being disposed relative to the cutter disks 59 and having a straight edge 64 opposed to said cutter disks and a side of the digger blades. The other scrapers 60' are disposed at the side of the hub disks 42 opposite the disk scrapers 59' and having offset straight edge portions 65, one of which edge portions is opposed to the hub disks and the other portion opposed to the opposite side of the digger blades, as shown in Figures 5 and 6. The scraper carrying collars 62 are of a length to provide spaces between adjacent collars to permit of adjustment of the collars longitudinally of the bar 63, and the scrapers toward and away from the disk cutters 59, the disk portion of the hubs and the digger blades.

Material, particularly vegetation, may accumulate on the outer end portions of the digger blades, and means are provided to remove the same from the digger blades. As shown, said means comprises beater blades 66 circumferentially spaced about and extending radially from hubs 67 fixed on and spaced longitudinally of a shaft 68, Figures 1, 3 and 6, extending transversely of the frame and journalled in bearing members 69 fixed to the side members 23 of the frame. The beater blade carrying shaft is rotated from the digger blade carrying shafts 47, 48 by sprocket chains 70 passing around sprocket wheels 71 fixed on the shafts 47, 48 and sprocket wheels 72 fixed on the beater blade carrying shaft 68, as shown in Figures 2 and 3. The beater blades 66 are spaced along the shaft 68 to revolve in paths intermediate the paths of movement of the digger blades 39, as shown in Figure 2, and the beater blades are curved in a direction reverse to the curvature of the digger blades, as shown in Figures 3 and 6.

Having thus described my invention, I claim:

1. In apparatus for breaking and working land, a frame, a shaft extending transversely of and rotatably mounted on the frame, hubs carrying circumferentially spaced digger blades and loosely mounted in juxtaposed relation on said shaft to have independent rotative adjustment to position the blades of adjacent hubs in staggered relation, said hubs arranged to couple the hubs together and rotate the hubs and blades in unison, means to connect and rotate the blade carrying hubs with the shaft, disk cutters of less diameter than the circle circumscribed by the rotation of the digger blades juxtaposed to a side of the blade carrying hubs and digger blades operative to cut vegetation and the land into strips, a bar mounted in the frame to extend parallel to and above the shaft, and pairs of scrapers adjustably mounted on the bar to have adjustment longitudinally of said bar and suspended from the bar to extend relative to the hubs, digger blades and disk cutters, one of said pairs of scrapers having a straight edge opposed to the disk cutters and a side of the digger blades and the other scraper of said pairs of scrapers having offset straight edge portions opposed to the opposite side of the hubs and digger blades to scrape from the disk cutters, the hubs and digger blades soil and other material adhering thereto.

2. In apparatus for breaking and working land, a frame, a shaft extending transversely of and rotatably mounted on the frame, hub members mounted in juxtaposed relation on the shaft and comprising a disk portion arranged with equidistantly spaced and radially extending recesses in one face thereof and tubular portions extending from the opposite sides of the disk portion and loosely mounted on the shaft, the ends of the tubular portions being arranged as jaw clutch members to engage the jaw clutch members of adjacent hub members and couple the hub members together, jaw clutch members slidable on and rotatable with the shaft adapted to engage the jaw members of the outer tubular portion of the outermost hub members and couple the hub members to the shaft, digger blades having a straight end portion arranged with a recess in one side and mounted in the radially extending recesses with the recessed side exposed and the remaining portion of the blades extending in an arcuate direction from the disk portions of the hub members, means to secure the digger blades in the radially extending recesses, and disk cutters engaged in the recesses in the side of the digger blades and secured in juxtaposed relation to the digger blades and the disk portions of the hub members by the means securing the digger blades in the radially extending recesses.

HARRY G. TRAVER.

REFERENCES CITED

The following references are of record in the file of this patent:

UNITED STATES PATENTS

| Number | Name | Date |
|---|---|---|
| 169,134 | Bean | Oct. 26, 1875 |
| 555,623 | Shailer | Mar. 3, 1896 |
| 787,840 | Friberg | Apr. 18, 1905 |
| 930,250 | Waterman | Aug. 3, 1909 |
| 935,680 | Niesz | Oct. 5, 1909 |
| 989,748 | Adams | Apr. 18, 1911 |
| 1,085,231 | Wolf | Jan. 27, 1914 |
| 1,165,477 | White | Dec. 28, 1915 |
| 1,669,947 | Peterson | May 15, 1928 |
| 2,140,871 | Hart | Dec. 20, 1938 |

FOREIGN PATENTS

| Number | Country | Date |
|---|---|---|
| 252,006 | Italy | Feb. 16, 1927 |
| 500,908 | France | Jan. 10, 1920 |